(12) United States Patent
Rønnekleiv (10) Patent No.: US 6,816,649 B2
(45) Date of Patent: Nov. 9, 2004

(54) FBG PRODUCTION SYSTEM (75) Inventor: Erlend Rønnekleiv, Trondheim (NO)

(73) Assignee: Optoplan, AS, Tronoheim (NO)

( * ) Notice: Subject to any disclaimer, the term of this patent is extended or adjusted under 35 U.S.C. 154(b) by 0 days.

(21) Appl. No.: 10/184,057

(22) Filed: Jun. 28, 2002

(65) Prior Publication Data

US 2003/0007732 A1 Jan. 9, 2003

(30) Foreign Application Priority Data

Jun. 29, 2001 (NO) ............................................... 013287

(51) Int. Cl.$^7$ .............................................. G02B 6/34
(52) U.S. Cl. ...................................................... 385/37
(58) Field of Search ................................... 385/37, 137

(56) References Cited

U.S. PATENT DOCUMENTS

| | | | |
|---|---|---|---|
| 5,367,588 A | * 11/1994 | Hill et al. ...................... | 385/37 |
| 6,072,926 A | 6/2000 | Cole et al. | |
| 6,081,640 A | * 6/2000 | Ouellette et al. ............. | 385/37 |
| 6,384,977 B1 | * 5/2002 | Laming et al. ............. | 359/570 |
| 6,548,225 B1 | * 4/2003 | Hammon et al. ........... | 430/321 |
| 6,549,705 B1 | * 4/2003 | Laming et al. ............... | 385/37 |
| 2003/0124438 A1 | * 7/2003 | Stepanov et al. .............. | 430/2 |

FOREIGN PATENT DOCUMENTS

| | | |
|---|---|---|
| EP | 0 978 738 A1 | 2/2000 |
| WO | WO 98/08120 A1 | 2/1998 |
| WO | WO 99/22256 A1 | 5/1999 |
| WO | WO 99/45414 A1 | 9/1999 |

* cited by examiner

Primary Examiner—David V. Bruce
Assistant Examiner—Thomas R Artman
(74) Attorney, Agent, or Firm—Moser, Patterson & Sheridan, L.L.P.

(57) ABSTRACT

An optical waveguide Bragg grating fabrication apparatus (1) comprises a light source (2) providing ultra-violet (UV) light and optical means (4,5A–B,6A–B,7A–B,9) for adapting the light beam to form an interference pattern in a photosensitive optical waveguide (8). The interference pattern has a spatial intensity modulation along the length of the optical waveguide and thus providing an optical grating in the waveguide in the form of a refractive index modulation.

The optical means comprises a movable non-uniform diffractive mask (4) for dividing the optical beam in at least two beams (12A–B) and optical elements for collecting two or more of the light beams to interfere on the optical waveguide.

The optical means comprises position control means for controlling the position of at least one mirror or lens.

Corresponding methods and the use of a super-periodic diffractive mask in such fabrication are described.

25 Claims, 5 Drawing Sheets

FBG PRODUCTION SYSTEM

This invention relates to an apparatus and a method for fabrication of optical waveguide Bragg gratings and the use of diffraction gratings in such fabrication.

Waveguide Bragg gratings are popular components used as wavelength selective filters in fiber-optic communication systems [1]. They are also popular for fiber-optic sensors because of their small size combined with the sensitivity of their reflection or transmission properties (typically the peak reflection wavelength) to strain, temperature and other mechanisms that change the fiber refractive index [2].

Fiber Bragg gratings (FBG) consist of a periodic modulation of the refractive index in the core (or more precisely within the modefield cross section) of an optical fiber [3]. The period of this modulation equals $\Lambda_B = \lambda_B/2n$ where n is the fiber refractive index and $\lambda_B$ is the optical Bragg wavelength at which the local reflectivity has its maximum. The index modulation is usually produced by illuminating the fiber core with ultraviolet (UV) light from a laser with wavelength $\lambda_{UV}$ in the range from 190 to 300 nm and with a spatial intensity modulation period $\Lambda_{IF} = \Lambda_B$. Typically, a frequency doubled Argon ion laser with wavelength $\lambda_{UV} \approx 244$ nm may be used.

The intensity modulation can be created by splitting the laser beam and recombining the beams on the fiber via a mirror [4, 5] or lens [6] arrangement at an angle $\alpha_{Fiber} = 2\arcsin(\lambda_{UV}/\Lambda_{IF})$. The UV beamsplitter can either be formed by a semitransparent mirror, a diffractive phase mask (spatially modulating the UV phase), or an amplitude mask (spatially modulating the UV amplitude). The angular separation between the +1 and −1 order diffracted beams from such a mask equals $\alpha_{Mask} = 2\arcsin(\lambda_{UV}/\Lambda_{Mask})$, where $\Lambda_{Mask}$ is the mask period at the position where the mask is illuminated.

It is also possible to produce gratings by placing the fiber in the near field behind a diffractive mask where diffractive orders still overlap. However, there are disadvantages with the near field approach. First, the zero and higher order diffracted beams from available non-ideal masks will cause an unwanted background exposure which limits the available index modulation amplitude in a fiber with a limited photoinduced index change. Second, nonlinearities in the photosensitivity (index change versus UV exposure energy) at high exposure levels may induce background index variations due to the mixing of three or more diffractive orders. These background index changes will depend on the relative phases of the mixed beams within the fiber, and it will therefore depend on variations in the distance between the fiber and the phase mask in the order of $\Lambda_{IF}$. In practice it is very hard to avoid that the distance varies by many $\Lambda_{IF}$, hence the resulting background index variations will cause errors in the effective grating phase seen by light propagating along the fiber waveguide. A third problem arises if one wants to use scanning techniques where a small diameter UV beam is scanned across the fiber and mask to enable spatially dependent modulation of the grating phase and amplitude by moving and dithering the mask during the scan, as suggested in [7]. In this configuration (and also in the scanning fiber technique [8] discussed in more detail below) the fiber must be placed very close to the mask (typically at a distance of 100–300 μm) to ensure overlap between the +1 and −1 order diffracted beams. The need for such a small spacing induces a high risk of damaging the delicate mask surface, as well as potential problems with static electric forces between the fiber and the mask, as discussed in [6].

Various stepwise grating exposure techniques have been disclosed. Two similar systems are disclosed in [8, 9], where the fiber is moved through a stationary UV interference pattern in the direction parallel to the fiber axis while short pulses are fired from the UV source at regular intervals when the phase of the UV intensity pattern relative to the fiber matches the wanted index modulation phase. A disadvantage of this pulsed technique is that the duty-cycle of the pulsing UV source must be low, preferably <20–30% in [8] and even lower in [9], to enable high visibility of the exposure and thus low background index change. With limited peak UV intensity available, for instance due to limited source power available or to damage limitations of the fiber or the UV optics, this will cause significantly longer production times compared to approaches using continuous exposure. Short writing time per FBG is generally advantageous, since it minimizes grating errors caused by slow drift in the relative positions of components in the FBG production system.

An alternative version of the step writing technique where the UV source is operated in a continuous wave mode is disclosed in [4]. In this approach the interference fringes are moved at the same speed as the fiber by moving the diffractive mask, but the mask position is reset each time the fiber has moved some multiple of Bragg periods. This technique can allow for shorter writing times than the techniques described in [8, 9].

A potential problem with the step writing techniques is that the periodic pulsing of the UV source or the resetting of the mask will tend to cause a super periodic modulation of the grating strength and/or phase with a super period length that corresponds to the pulse or resetting period. If the resetting period equals $ML_B$ where M is an integer, this will cause grating sideband reflections at wavelengths that correspond to Bragg wave numbers which are separated from the nominal Bragg wave number $2p/L_B$ by integers of $2p/(M_{LB})$. There are two reasons why M preferably should be a small number. First, the sideband separation can usually be made so large by increasing M that the sidebands do not cause any problem for the FBG applications of interest. Second, as discussed in [9] the strength of the sideband reflections will be reduced when M is reduced due to averaging. This is because the number of step exposures at each position on the fiber is increased.

In the mask stepping approach, maximizing the speed and accuracy by which the mask position is reset will also contribute to minimize the super periodic modulation and the grating sideband reflectivity. In order to minimize M and to maximize the resetting speed it is thus desirable that the fringe position can be modulated with a large bandwidth. This may limit the size of the mask, as the mechanical resonance frequencies are typically inversely proportional to the size of the modulated device (the mask).

It is possible with the step writing techniques to impose discrete phase-shifts in the index modulation by suddenly changing the phase of the interference fringes as the fiber is scanned through the UV spot. The fiber section that is illuminated by the UV spot when the fringe phase changes will in this case be partially exposed with both fringe phases, and the grating phase-shift will thus occur gradually across this section. Apodization of the grating strength can be implemented without perturbing the grating phase or the mean exposure per grating period by modulating the phase of the fringes relative to the fiber while the fiber is scanned through the UV spot, without perturbing the mean phase value.

It is also possible to stretch or compress the Bragg period $\Lambda_B$ slightly relative to the UV interference period $\Lambda_{IF} = \lambda_{UV} \sin(\alpha_{Fiber}/2)$ by gradually changing the fringe phase relative to the fiber as the UV spot is scanned along the fiber. The Bragg wavelength shift achievable by this method is limited to about $\Delta\lambda_{B,max}=\Lambda_{IF}^2/(4\, L_{Spot})$ where $L_{Spot}$ is the 3 dB UV interference spot size [5]. When the shift increases above this limit the visibility of the integrated exposure decreases substantially because the fringe phase exposed to each fiber position varies significantly when the fiber moves through the UV spot. With typical numbers $L_{Spot}$=0.1 mm, $\lambda_B$=1550 nm, and n=1.465 we have $\Delta\lambda_{B,max}=\lambda_B^2/(4nL_{Spot})$=2.1 nm. Gratings covering bandwidths larger than $2\Delta\lambda_{B,max}$ cannot be exposed in a single scan with the prior art step writing techniques.

Figure 1:
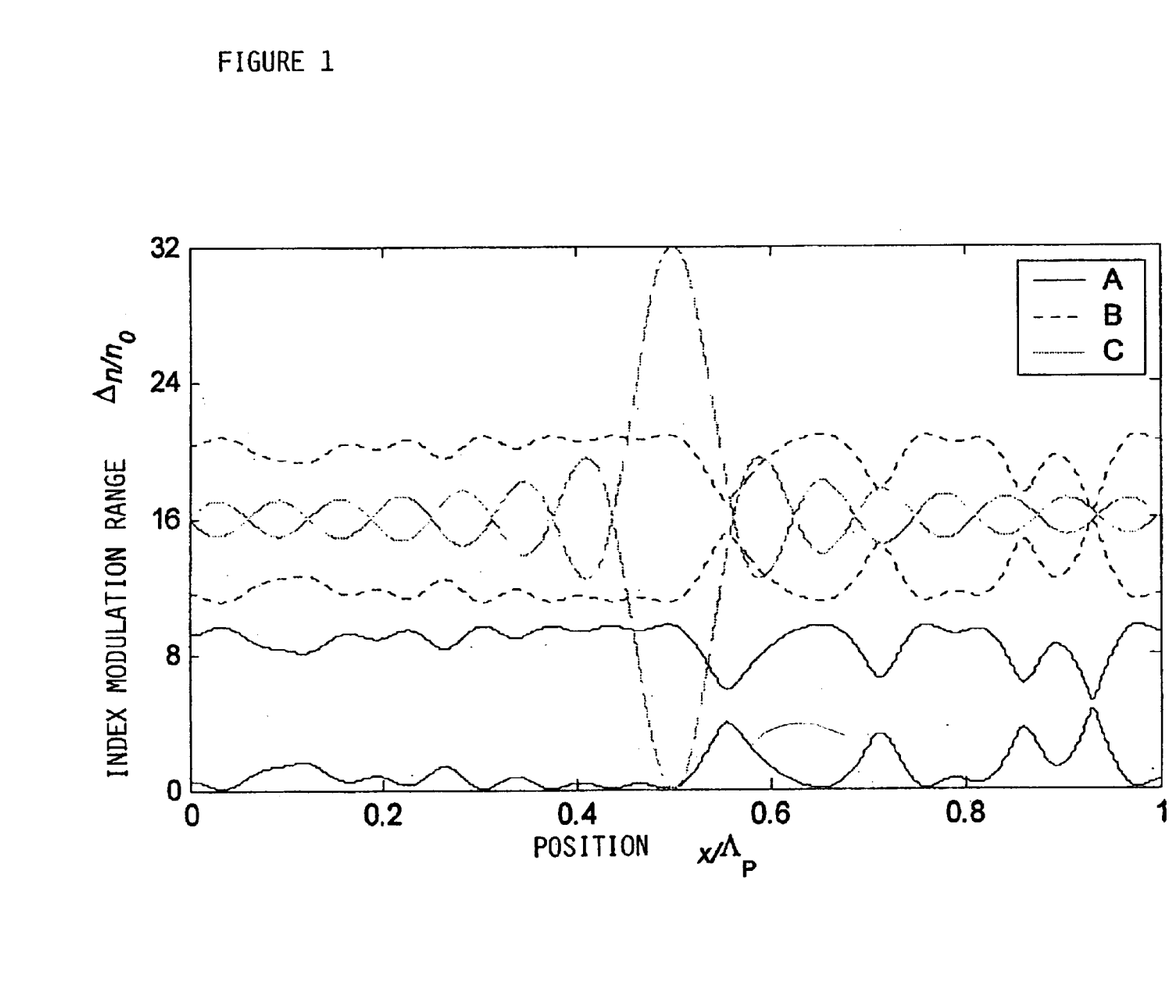
FIG. 1 shows the index modulation range (maximum and minimum within one super-period $\Lambda_P$ of an N=16 channel optical waveguide Bragg grating.

Multi-channel gratings [10] are promising devices both for telecommunication and sensor applications employing wavelength division multiplexing (WDM), as they comprise the functionality of a number of single gratings into one grating making a more compact device. The index modulation of a multi-channel grating with N Bragg wavelength can be modelled as $$\Delta n = \Delta n_0 \sum_{i=1}^{N} \cos 2\pi(1/\Lambda_{B0} + 1/\Lambda_P + \phi_i)$$

where $\Delta n_0$ is the index modulation amplitude of each subgrating, $2\pi/\Lambda_{B0}$ is the Bragg wavenumber offset, $2\pi/\Lambda_P$ is the Bragg wavenumber channel spacing, and $\phi_i$ is the phase of sub-grating i. $\Delta n$ is periodic with period $\Lambda_P$. If the phases $\phi_i$ of all subgratings are equal, the peak-to-peak index modulation will equal $\Delta n_{pp}=2N\Delta n_0$, as illustrated by curve C in FIG. 1 for the case N=16. As the available index change in photosensitive fibers is limited, it may be advantageous to minimize $\times n_{pp}$. For large values of N the value of $\Delta n_{pp}$ can be reduced to the order of $2\sqrt{N}\Delta n_0$ by carefully selecting the phases $\phi_i$ as shown in [11]. Numerical calculations indicate that $\Delta n_{pp}$ can be reduced to $(2\sqrt{N}+1.5)\Delta n_0$ or less for N>4, as illustrated for N=16 by curve A in FIG. 1. It is therefore of interest to find a method for writing multi-channel gratings where the subgrating phase relationship can be accurately controlled. Also in multi-wavelength fiber Bragg lasers, proper control with the relative phase the grating channels is of importance [12].

The step-writing method described above allows arbitrary multi-channel gratings to be produced in a single writing operation. However, the total number of channels must be confined within the available bandwidth of $2\Delta\lambda_{B,max}$. It is also possible to write multi-channel gratings sequentially, inscribing one channel at the time. If the total bandwidth covered by the channels exceeds $2\Delta\lambda_{B,max}$ the UV interference period $\Lambda_{IF}$ needs to be changed between each writing cycle. This can be accomplished by replacing the diffractive mask and/or tuning the interferometer mirror or lens positions, possibly combined with a tilting of the mirror axis. The distance between the fiber and the diffractive mask may also have to be adjusted to ensure proper overlap of the interfering beams at the fiber. In this replacement and readjustment process the task of maintaining control with the relative phases of the different subgrating exposures is very difficult.

A method will be described in the following for ensuring control of the relative phase of the different subgratings during such sequential exposures. However, each writing cycle will always contribute with a mean index of $\Delta n_0$, and the total index modulation including background index will therefore at least be in the order of $(N+\sqrt{N}+0.75)\Delta n_0$, as illustrated by curve B in FIG. 1. The only way to avoid a background index in the order of $Nn_0$ is by inscribing all Bragg wavenumbers grating in a single exposure.

If the step-writing methods described above are used to produce multi-channel gratings covering a large bandwidth (>20 nm), the UV spot size $L_{Spot}$ would need to be extremely small (at least <20 $\mu$m). It is possible to focus UV laser beams extremely tight. However, because the UV intensity must not exceed the damage threshold of the fiber, the time required to write a single grating may become unacceptably long.

It is a first objective of the present invention to provide an easy and accurate method and a device for adjusting the interference period $\Lambda_B$ in an optical waveguide Bragg grating production facility over a wide range, thus allowing the facility to easily produce a wide range of Bragg wavelengths in a flexible way.

A second objective is to provide a method and device for varying $\Lambda_B$ during the grating exposure while maintaining accurate control with the phase of the exposed pattern during the exposure.

A third objective is to provide a practical method and device for writing large bandwidth multiple channel optical waveguide gratings with high spatial resolution superperiodically modulated grating profile with (a close to) optimum utilization of the available refractive index change, which does not require focusing of the laser beam down to a spot size that is comparable to or smaller than the wanted spatial resolution.

A fourth objective is to provide a practical method and device for writing multiple channel optical waveguide gratings with high spatial resolution superperiodically modulated grating profile, which only requires a diffractive mask that is slightly longer than one superperiod length plus the UV interference spot size.

A fifth objective is to provide a fast and effective method for writing waveguide gratings with a step exposure technique with a short stepping period, which maximizes the strength of the grating and minimizes the amplitude of unwanted grating, which does not require high bandwidth modulation of the phase mask position, or put limitations on the size of the phase mask that can be used.

The objectives are met with an apparatus, methods and uses according to the attached independent claims.

The invention will now be explained in further detail with reference to the accompanying drawings wherein.

Figure 2A:
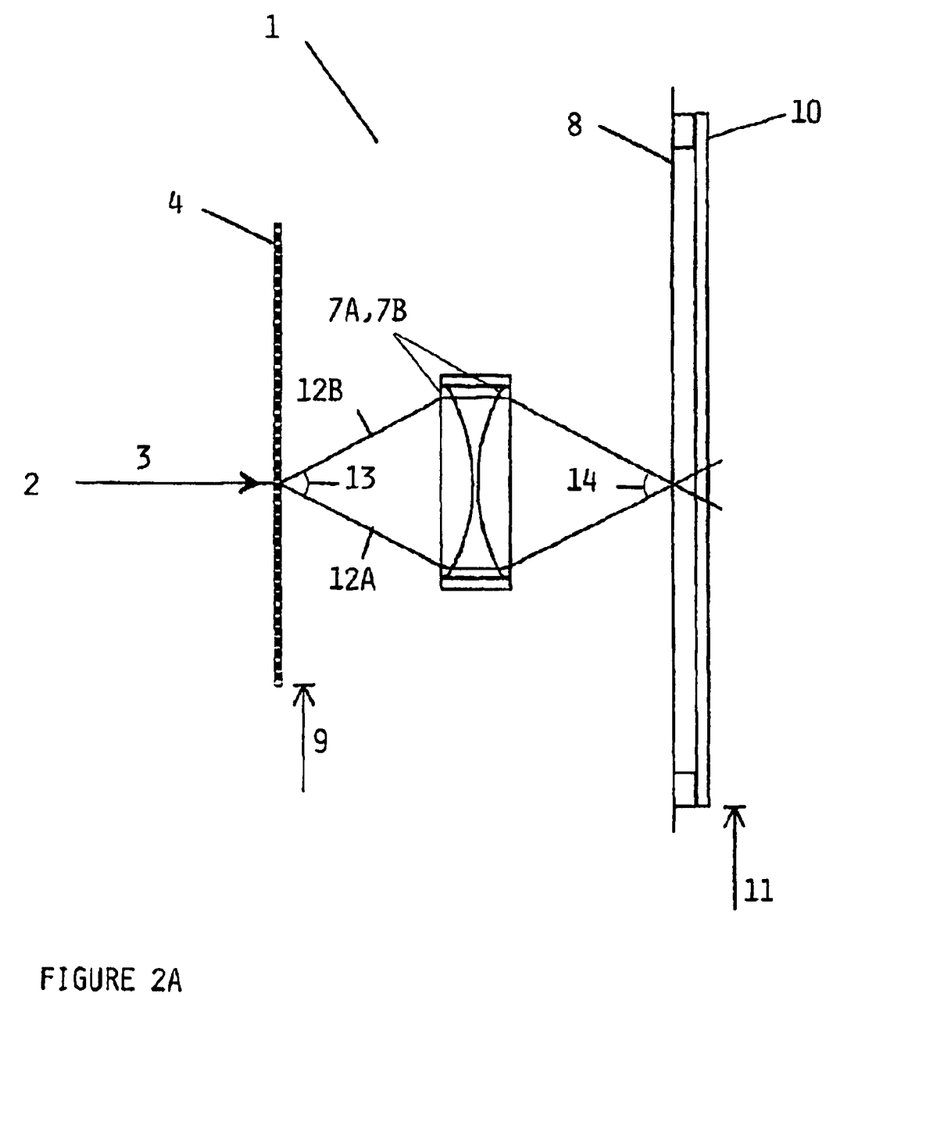
FIG. 2A shows the UV interferometer configuration where the UV beams are recombined using lenses.

A preferred implementation of the apparatus and method is illustrated in FIG. 2A. An ultraviolet (UV) source 2 provides a beam 3 of UV light. The beam of light falls on otical means 4,7A,7B,9 for adapting the light beam to form an interference pattern in a photosensitive optical waveguide 8. More specifically, the beam 3 of UV light is first transmitted through a diffractive mask 4 where the beam is divided in mainly two diffracted beams 12A,12B, where one beam 12A is a +1 order diffracted beam and the other beam 12B is a −1 order diffracted beam. The two beams 12A,12B are directed away from the diffractive mask at directions differing by an angle $\alpha_{mask}$ 13. The two beams 12A,12B are recombined by two cylinder lenses 7A,7B mounted in a lens holder to create an interference pattern on the waveguide 8. The two beams recombine at an angle $\alpha_{waveguide}$ 14 with respect to each other. The position of the waveguide 8 and the waveguide holder 10 is movable in the direction parallel with the fiber. When this waveguide and the waveguide holder is moved, the waveguide is scanned through the interference fringe pattern. The illuminated region on the diffractive mask 4 can be varied by moving the mask position $x_{Mask}$. In this description the term waveguide is intended as a general term, including optical fibers, waveguides in integrated structures, and other commonly known guides for optical light.

Separate laser interferometers are used to measure the position of the waveguide $x_{waveguide}$ and the mask $x_{Mask}$ (relative to the substrate onto which the lens actuator is mounted, see below) with a precision that is significantly better than one Bragg period.

The diffractive mask 4 comprises a non-uniformity in a direction parallel with the longitudinal axis of the waveguide 8. A non-uniform grating is written in the waveguide 8 by imaging the pattern on the illuminated part of the mask 4 onto the waveguide 8.

The diffractive mask 4 can be moved along a direction of the non-uniformity, that is, along a direction of the non-uniformity which is imaged onto the waveguide in a direction parallel with the longitudinal axis of the waveguide. The direction of the non-uniformity can be denoted the x-direction.

The position of the fringes in the interference pattern of the UV radiation which writes the grating in the waveguide can be controlled by position control means 9. The position of these fringes is typically controlled within an accuracy better than the typical Bragg period.

In a preferable embodiment of the invention these position control means 9 control the position of the diffractive mask 4, preferably with an accuracy better than a period of the interference pattern. The position control means may also comprise means for controlling the position of one or more lenses 7A–B and/or mirrors 5A–B,6A–B which form a part of the optical means. In a further preferred embodiment of the invention the first position control means 9 is adapted to move an optical mirror 5A,5B or a lens 7A,7B in a direction substantially parallel with the surface of the phase mask 4 or the longitudinal direction of the waveguide 8. In order to control the phase of the interference fringes within time intervals corresponding to a waveguide movement of less than a few Bragg periods the position of one or more of the lenses or mirrors can be modulated with a large bandwidth.

Figure 2B:
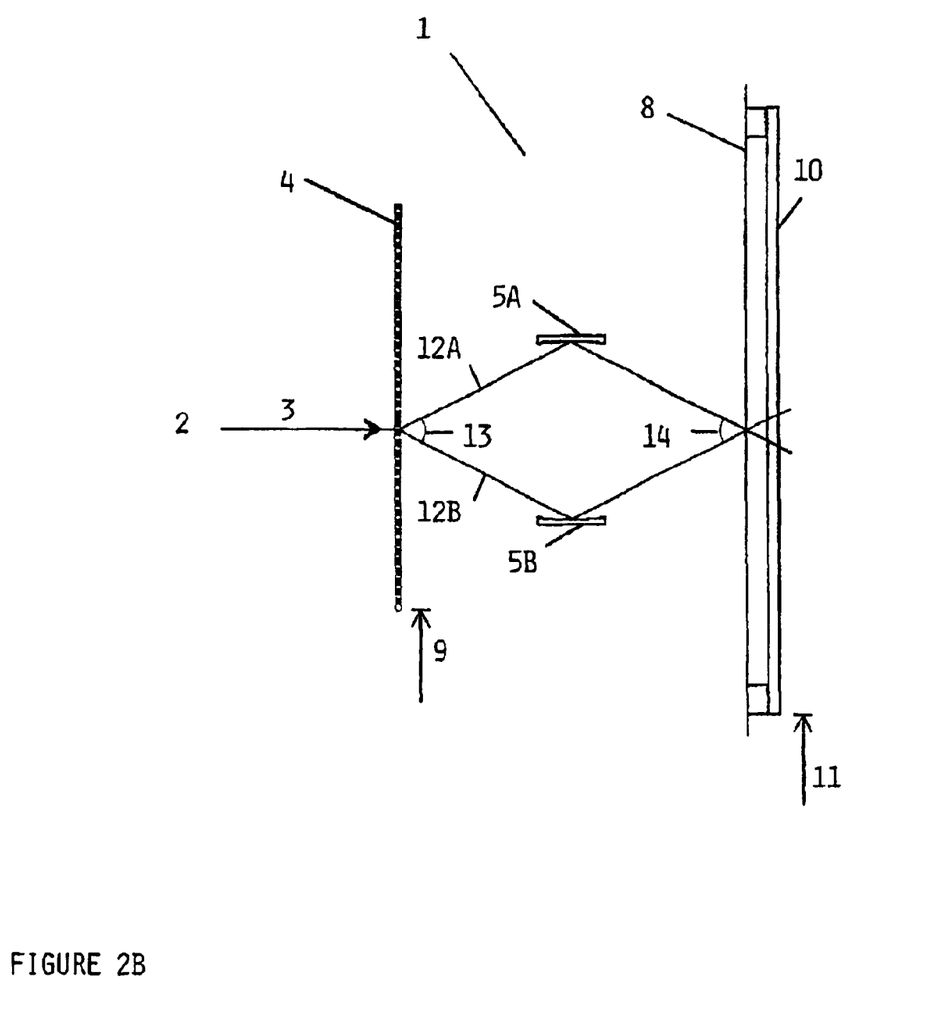
FIG. 2B shows the UV interferometer configuration where the UV beams are recombined using mirrors in a Talbot geometry.
Figure 2C:
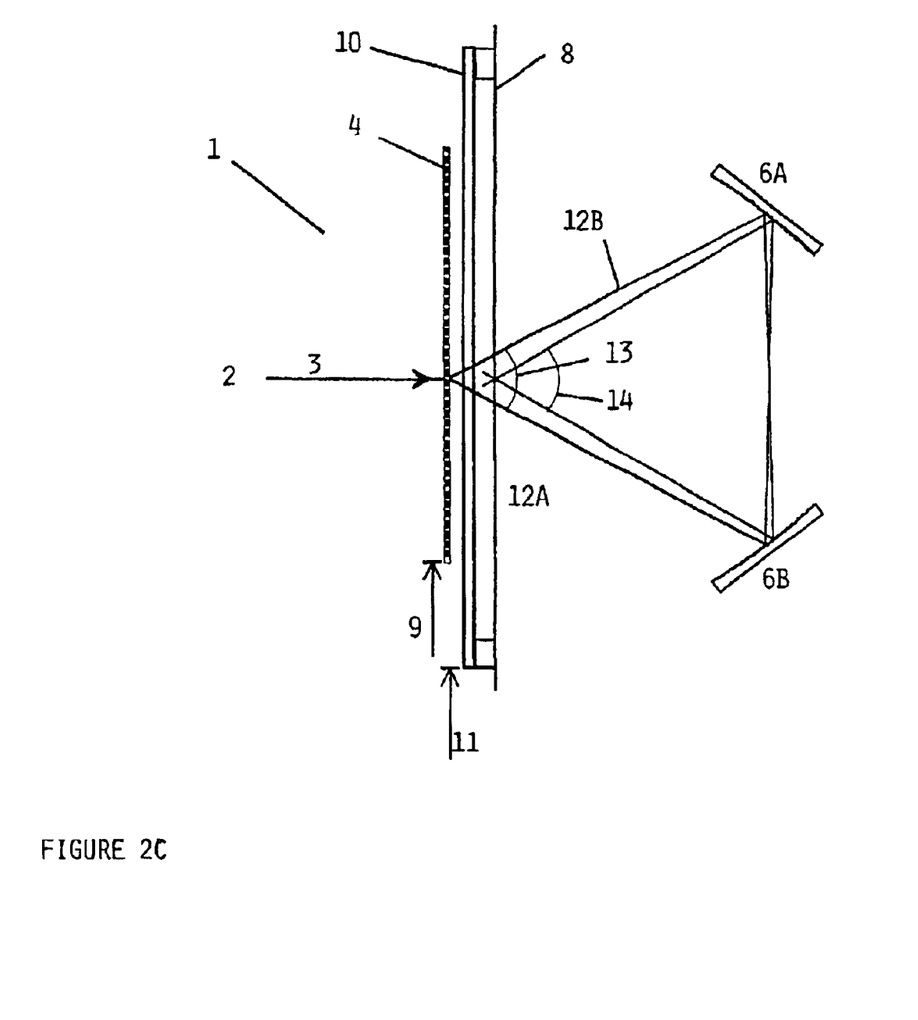
FIG. 2C shows the UV interferometer configuration where the UV beams are recombined using mirrors in a quasi-Sagnac configuration.

Alternative implementations employing mirrors instead of lenses are illustrated in FIG. 2B with a Talbot interferometer. In this case the two diffracted beams 12A,12B coming from the diffractive mask 4 are combined by mirrors 5A,5B in the path of each beam. In FIG. 2C a version of the invention using a quasi Sagnac interferometer is shown. In this case the two diffracted beams 12A,12B being formed by the diffractive mask 4 are first transmitted through the waveguide and the waveguide holder assembly. The first beam impinges first on one mirror 6A which directs the beam onto the other mirror 6B which directs the beam back towards the waveguide. The other beam impinges first on one mirror 6B which directs the beam onto mirror 6A which then directs this other beam back towards the waveguide. The two beams are thus made to combine in the region of the waveguide.

In these implementations the phase of the interference fringes may also be controlled by moving or tilting one or both mirrors 5A–B,6A–B, possibly with a piezoelectric actuator. In all three illustrated interferometer designs it is also possible to control the interferometer phase by controlling (not only measuring) $x_{waveguide}$ or $x_{mask}$ very accurately. High speed resetting of the interference phase for the step writing technique may, though, be easier to implement by moving the lenses/mirrors which usually can have smaller dimensions than the waveguide 8 and the mask 4. The phase can also be adjusted by other types of modulators, like electro-optic, thermo-optic, or stress-optic, strain-optic devices.

A preferred embodiment of the invention comprises reset means for rapidly resetting the position of one or more lenses, mirrors or glass prisms and/or the angle of one or more mirrors which is controlled by the position control means 9, for example at given time intervals, in order to limit the maximum displacement of the envelope of the interference pattern to only one or a limited number of Bragg periods between each reset operation.

High speed phase control may not be required if step writing is implemented by pulsing of the UV source 2. In one preferred embodiment of the invention, the light source means 2 comprises means for reducing the intensity of or switching off the light source, in particular for switching the light source off during a reset operation. In such a way a reduction in the time averaged fringe contrast due to the varying phase during the resetting operation is avoided. Further, the use of such an intensity modulation in addition relaxes the requirements on the speed of the reset operation, thus yielding a possibility of writing with a somewhat higher speed along the waveguide for a given bandwidth of the modulator that is to perform the resetting of the fringe position. Such an intensity modulator could also be arranged in combination with a phase modulator.

In a first preferred implementation the phase mask has a non-uniformity comprising a variation in the amplitude, period or phase of the pattern.

The phase mask period $\Lambda_{Mask}$ can be continuously chirped or step-wise chirped in the x-direction. In one version the mask can be linearly chirped. The Bragg wavelength can thus be changed during the writing process by moving the phase mask.

Figure 3:
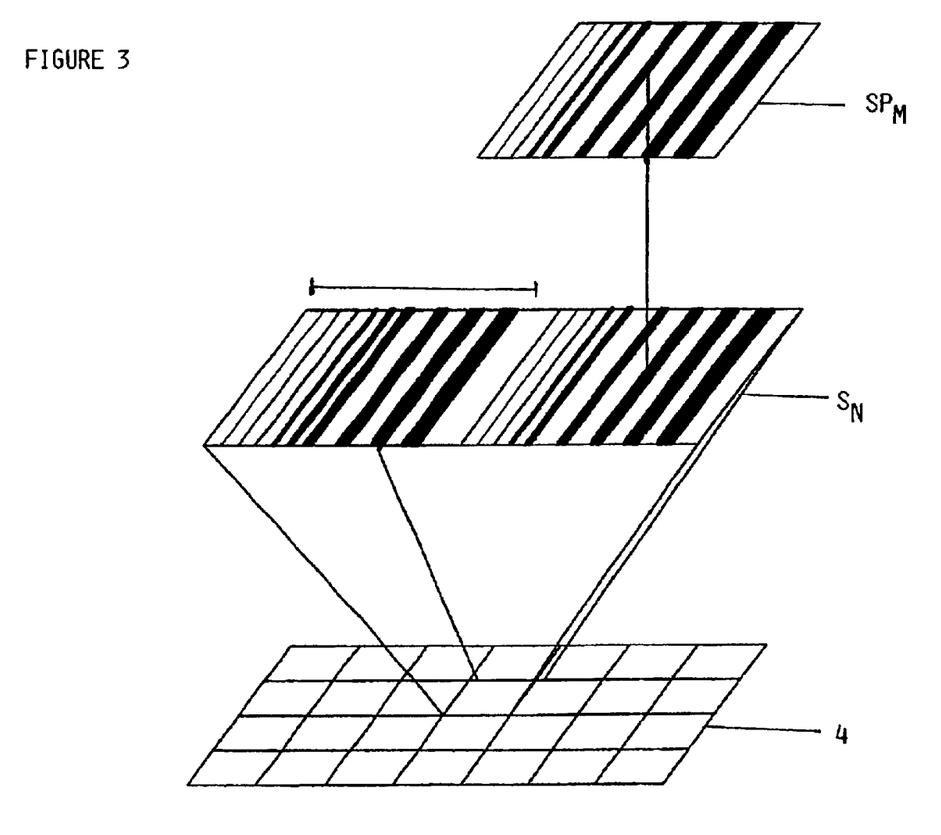
FIG. 3 illustrates a diffractive mask with a super-periodic mask pattern.

A more complex mask can be as illustrated in FIG. 3 where a diffractive mask 4 having one or more sections $S_N$, each section characterized by its super-periodic pattern. The super-periodic pattern of each section may consist of repeated equal segments $SP_M$ of a periodic index variation, the length of each segment corresponding to one super-period, $\Lambda_P$. The super-period may be an arbitrarily modulated index variation.

A spatially varying (non-uniform) diffraction pattern is inscribed in the diffractive mask. The period $\Lambda_{Mask}$ of the mask pattern can be varied or chirped in the x-direction. The period $\Lambda_B$ inscribed in the waveguide can thus be selected simply by changing $x_{Mask}$. Curved lenses should preferably be used for focusing of the beams inside the interferometer. This ensures that the overlap of the two beams at the waveguide remains unchanged when $\alpha_{Mask}$ and $\alpha_{Waveguide}$ vary, as opposed to the situation if glass prisms are used instead of lenses. Similarly, curved focusing mirrors should preferably be used in the interferometers of FIGS. 2B and 2C. If no curved optics is used it may be necessary to vary the spacing between the mask and the waveguide to ensure overlap at the waveguide of the UV beams. This could in principle be achieved by tilting the mask slightly relative to the x-axis. One or more of the lenses could be Fresnel-type lenses.

Sequential writing of multiple Bragg wavelengths into the same waveguide section can be achieved by moving the diffractive mask 4 to a position with a different period $\Lambda_{Mask}$ between each writing sequence. Provided that the diffractive grating phase distribution along the mask is known, the relative phase of the overlaid gratings can be controlled by measuring the exact $x_{Mask}$ and $x_{Waveguide}$ and controlling the lens position accordingly.

Continuous chirping of the Bragg period along the waveguide can be achieved by moving the chirped mask continuously during the exposure. The speed of the fringe phase modulation (for step writing) must then be increased or decreased, depending on the speed and direction of the mask, to compensate for the phase mask movement.

It was mentioned in the prior art section that it is necessary to inscribe all the desired periodicities of a multiple channel grating in one single writing operation in order to obtain an optimum utilization of the available refractive index change of the waveguide. In an alternative preferred implementation of the present invention a diffractive mask is used that, when illuminated by the UV beam, creates the required periodic exposure pattern on the waveguide. The relatively complex mask pattern required for such a mask could in principle be created by e-beam lithography. However, it is difficult to produce e-beam masks which are accurate in phase over lengths that exceed ~0.5 mm, due to so-called stitching errors between different regions on the mask and poor linearity in the relative translation of the mask and e-beam [13]. We therefore propose to use a relatively short mask pattern, with a length of at least one super period $\Lambda_P$ plus the UV beam diameter at the mask. The pattern is repeatedly transferred to the waveguide in the same way as with the traditional step writing method described previously, with the only difference that the waveguide is moved an exact multiple of $\Lambda_P$ instead of $\Lambda_B$ periods in between each time the phase/position of the fringe pattern is reset. The tracking and resetting of the fringe pattern position relative to the waveguide may in this case preferably be done by moving the mask and not the lens, since $\Lambda_P$ may typically be a larger distance than what can typically be controlled accurately by a cheap piezoelectric transducer. Apodization and phase-shifts that are common to all grating channels can still be applied by manipulating the phase of the Bragg periods as a function of the illuminated waveguide position.

It may be a problem to design super-periodic diffractive masks that varies the fringe phase and amplitude as required while the mean exposure stays constant along the waveguide. A solution to this problem is to inscribe a second "dummy" grating with the same super period $\Lambda_P$ but with a Bragg wavelength outside the band of interest, which has a mean exposure variation that compensates for that of the first exposure. A relatively accurate control with the positioning of the first and second grating exposure is required, although not to within less than $\Lambda_B$. This can be achieved with the proposed grating production system if the two diffractive mask patterns are inscribed into different sections of the same diffractive mask.

It is clear from the description of the apparatus according to the invention that a corresponding method of fabricating an optical waveguide grating can be achieved using the apparatus of the invention.

In all implementations of the present invention it may be necessary to calibrate the phase of the interference pattern created by the mask as a function of $x_{Mask}$. This can be achieved by writing a test grating with exposure from different sections of the mask, and subsequently characterizing the spatial dependence of the complex grating index modulation function. An example of a method for such characterization via measurement of the complex reflection spectrum has previously been described elsewhere for optical fiber Bragg gratings [14].

REFERENCES

[1] C. R. Giles, "Lightwave Applications of Fiber Bragg Gratings", J. of Lightwave Technol., Vol. 15, No. 8, pp. 1391–1404, 1997.

[2] K. O. Hill and G. Meltz, "Fiber Bragg Grating Technology Fundamentals and Overview", J. of Lightwave Technol., Vol. 15, No. 8, pp. 1263–1276, 1997.

[3] A. D. Kersey, M. A. Davis, H. J. Patrick, M. LeBlanc, K. P. Koo, C. G. Askins, M. A. Putnam, and E. J. Friebele, "Fiber Grating Sensors", J. of Lightwave Technol., Vol. 15, No. 8, pp. 1442–1463, 1997.

[4] G. W. Yoffe, J. W. Arkwright, and B. C. Smith, "Flexible and stable interferometer for fabricating fiber Bragg gratings", in conference on *Bragg Gratings, Photosensitivity and Poling in Glass Waveguides*, Paper ThE16, Florida, 1999.

[5] R. Kashyap, "Apparatus and method for generating an interference pattern to be written as a grating in a sample of a photosensitive material", PCT patent application WO 00/08500.

[6] R. I. Laming and M. Ibsen, "fabrication of optical waveguide gratings", PCT patent application WO 99/22256.

[7] M. J. Cole, W. H. Loh, R. I. Laming, M. N. Zervas and S. Barcelos, "Moving fibre/phase mask-scanning technique for enhanced flexibility in producing fibre gratings with uniform phase mask", Electronics Lett., Vol. 31, No. 19, pp 1488–1490, 1995.

[8] R. I. Laming and M. Cole, "Fabricating optical waveguide gratings", PCT patent application WO 98/08120.

[9] A. Asseh, H. Storøy, B. E. Sahlgren, N. Sandgren, and R. Stubbe, "A Writing Technique for Long Fiber Bragg Gratings with Complex Reflectivity Profiles", J. of Lightwave Technology, Vol. 15, No. 8, pp. 1419–1423, 1997

[10] R. I. Laming and M. Ibsen, "Optical fibre gratings", PCT patent application WO 99/22255.

[11] S. W. Løvseth, Dr. Ing. thesis, Appendix to Chapter 8, Norwegian Univ. of Sci. and Tech., to be published.

[12] S. W. Løvseth and D. Y. Stepanov, "Analysis of Multiple Wavelength DFB Fiber Lasers", J. of Quantum Electronics, Vol. 37, No. 6, pp 770–780, 2001.

[13] J. Alberts et. al., "Minimization of Phase Errors in long Fiber Bragg Grating Phase Masks made using Electron Beam Lithography", IEEE Photonics Tech. Letters, Vol. 8, No. 10, pp 1334–1336, 1996.

[14] D. Sandel, R. Noe, G. Heise, and B. Borchert, "Optical Network Analysis and Longitudinal Structure Characterization of Fiber Bragg Grating", J. of Lightwave Tech., Vol. 16, No. 12, 1998.

What is claimed is:

1. An apparatus for fabricating an optical waveguide Bragg grating comprising:

a light source for providing a beam of ultra violet (UV) light;

optical means for adapting the light beam to form an interference pattern in a photo sensitive optical waveguide, the interference pattern having a spatial intensity modulation along a length of the optical waveguide and thus providing an optical grating in the waveguide in the optical form of a refractive index modulation, wherein the optical means comprises
- a first position control means and a waveguide holder assembly comprising a second position control means for setting the position of the optical waveguide,
- a movable non-uniform diffractive mask for dividing the optical beam into at least two beams, wherein the diffractive mask comprises one or more sections with different super-periodic patterns having repeated segments of arbitrarily modulated periodic index variation, each segment forming one period of the super-periodic pattern, and
- optical elements for collecting two or more of the light beams to interfere on the optical waveguide.

2. The apparatus of claim 1, wherein the arbitrarily modulated periodic index variation comprises a chirped mask pattern.

3. The apparatus of claim 2, wherein the arbitrarily modulated periodic index variation comprises a continuously or step-wise chirped mask pattern.

4. An apparatus for fabricating an optical waveguide Bragg grating comprising:
- a light source for providing a beam of ultra violet (UV) light;
- optical means for adapting the light beam to form an interference pattern in a photo sensitive optical waveguide, the interference pattern having a spatial intensity modulation along a length of the optical waveguide and thus providing an optical grating in the waveguide in the form of a refractive index modulation, wherein the optical means comprises
- a first position control means and a waveguide holder assembly comprising a second position control means for setting the position of the optical waveguide,
- a movable non-uniform diffractive mask for dividing the optical beam into at least two beams, and
- Fresnel lenses for collecting two or more of the light beams to interfere on the optical waveguide.

5. An apparatus for fabricating an optical waveguide Bragg grating comprising:
- a light source for providing a beam of ultra violet (UV) light;
- optical means for adapting the light beam to form an Interference pattern in a photo sensitive optical waveguide, the interference pattern having a spatial intensity modulation along the length of the optical waveguide and thus providing an optical grating in the waveguide in the form of a refractive index modulation, wherein the optical means comprises
- a first position control means and a waveguide holder assembly comprising a second position control means for setting the position of the optical waveguide,
- a movable non-uniform diffractive mask for dividing the optical beam into at least two beams, wherein the diffractive mask comprises one or more sections with different super-periodic patterns having repeated segments of arbitrarily modulated periodic index variation, each segment forming one period of the super-periodic pattern, and
- an arrangement of curved mirrors for collecting two or more of the light beams to interfere on the optical waveguide.

6. A method of fabricating an optical waveguide grating comprising:
providing a beam of light using an ultraviolet (UV) light source;
directing the UV beam through optical means for providing an interference pattern in a photosensitive optical waveguide;
altering and determining the position of at least part of the optical means relative to the UV beams using a first position control means;
altering and determining the position of an optical waveguide holder assembly using a second position control means, the optical waveguide holder assembly comprising the at least one optical waveguide; and
controlling the position of a non-uniform diffractive mask being part of the optical means, thereby controlling which area of the mask is exposed to the UV beam, and thus yielding an interference pattern in the waveguide corresponding to that part of the diffractive mask which is exposed to the UV beam, wherein
the interference pattern on the waveguide is held stable relative to the waveguide during a movement of the waveguide over a distance by continuously controlling the position of one or more lenses, mirrors or glass prisms and/or the angle of one or more mirrors, and
the position of the one or more tenses, mirrors or glass prisms and/or the angle of one or more mirrors is rapidly reset at intervals in order to limit the maximum displacement of the envelope of the interference pattern to only one or a limited number of Bragg periods between each reset operation.

7. A method of fabricating an optical waveguide grating comprising:
providing a beam of light using an ultraviolet (UV) light source;
directing the UV beam through optical means for providing an interference pattern in a photosensitive optical waveguide;
altering and determining the position of at least part of the optical means relative to the UV beams using a first position control means;
altering and determining the position of an optical waveguide holder assembly using a second position control means, the optical waveguide holder assembly comprising the at least one optical waveguide; and
controlling the position of a non-uniform super-periodic diffractive mask being part of the optical means, thereby controlling which area of the mask is exposed to the UV beam, and thus yielding an interference pattern in the waveguide corresponding to that part of the diffractive mask which is exposed to the UV beam.

8. The method of claim 7, wherein a reset operation is executed one or more times, the reset operation comprising moving the super-periodic diffractive mask one or more super-periods, $\Lambda_P$.

9. A method of forming a grating profile having a desired length and a desired period, phase, and amplitude distribution along the grating profile in a photo-sensitive optical waveguide, comprising:
illuminating a portion of a non-uniform phase mask with an ultraviolet (UV) beam smaller in dimension than a total length of the non-uniform phase mask resulting in an interference pattern region smaller in dimension than the desired length of the grating profile;
moving the optical waveguide through the interference pattern region; and moving the non-uniform phase mask to maintain illumination of a region of the non-uniform phase mask having a grating period that is appropriate for maintaining a period of the interference pattern region sufficiently close to the desired period of the grating profile in a region of the optical waveguide being exposed.

10. The method of claim 9, wherein the non-uniform phase mask is not moved during exposure of the desired grating length.

11. The method of claim 10 further comprising:

moving the non-uniform phase mask; and forming another grating profile in the optical waveguide using the non-uniform phase mask.

12. The method of claim 9, further comprising adjusting a phase and visibility of total UV exposure of the optical waveguide via track end reset operations.

13. The method of claim 12, wherein adjusting the phase and visibility of the total UV exposure of the optical waveguide via track and reset operations comprises superimposing a patterned motion on at least one at movement of the optical waveguide or movement of the phase mask.

14. The method of claim 9, wherein:

illuminating the portion of the non-uniform phase mask with the UV beam results in a plurality of beams; and the method further comprises collecting at least two out of the plurality of beams with one or more optical collection elements that are smaller in dimension than a total length of the non-uniform phase mask resulting in an interference pattern region smaller in dimension then the desired length of the grating profile.

15. The method of claim 14, further comprising moving the optical collection elements to adjust a phase and visibility of the total UV exposure of the optical waveguide.

16. The method of claim 14, further comprising moving the optical collection elements to achieve the desired period, phase, and amplitude distribution along the grating profile.

17. A method of writing a grating profile, having a desired length and a desired period, phase, and amplitude distribution along the grating profile, in a photo-sensitive optical waveguide, comprising:

illuminating a non-uniform phase mask with an ultraviolet (UV) beam resulting in a plurality of light beams;

collecting at least two of the light beams with optical elements to form an interference pattern region;

moving the optical waveguide through the interference pattern region;

moving the non-uniform phase mask to maintain illumination of a portion of the non-uniform phase mask having a grating period that is appropriate for generating an interference spot on the optical waveguide having a period sufficiently close to the desired period of the grating profile being written; and moving the optical elements in a defined pattern versus time to adjust the phase of the interference pattern region, wherein the defined pattern is chosen to compensate for movement of both the optical waveguide and the non-uniform phase mask.

18. The method of claim 17, wherein different grating profiles are formed in different regions of the optical waveguide without changing the non-uniform phase mask.

19. The method of claim 17, wherein the grating profile covers a Bragg wavelength bandwidth of at least 60 nm.

20. The method of claim 17, wherein non-uniformities in the grating are formed in a different direction than non-uniformities in the non-uniform phase mask.

21. The method of claim 17, wherein moving the optical elements in a defined pattern adjusts a phase and visibility of total UV exposure of the optical waveguide via track and reset operations.

22. An apparatus for forming a grating profile, having a desired length and a desired period, phase, and amplitude distribution along the grating profile, in a photo-sensitive optical waveguide, comprising:

a light source;

a non-uniform mask;

a mask holding assembly capable of holding and moving the non-uniform mask while the non-uniform mask is illuminated by the light source;

an optical collection holding assembly capable of holding and moving optical collection elements used to collect at least two light beams generated by illuminating the non-uniform mask with the light source to form an interference pattern region; and an optical waveguide holding assembly capable of holding and moving the optical waveguide through the non-uniform interference pattern region.

23. The apparatus of claim 22, wherein the optical collection elements comprise a plurality of mirrors.

24. The apparatus of claim 22, wherein the optical collection elements comprise one or more lenses.

25. The apparatus of claim 22, wherein the optical collection assembly is movable in a defined pattern versus time to adjust a phase of the interference pattern region, wherein the defined pattern is chosen to compensate for movement of both the optical waveguide and the non-uniform mask to achieve the desired phase and amplitude distribution of the total exposed grating profile.

* * * * *